US005426481A

United States Patent [19]

Slater et al.

[11] Patent Number: 5,426,481

[45] Date of Patent: Jun. 20, 1995

[54] ORDER FINISHING

[75] Inventors: Walter C. Slater, Prattsburg; Gary W. Ahlquist, Webster, both of N.Y.

[73] Assignee: Eastman Kodak Company, Rochester, N.Y.

[21] Appl. No.: 241,985

[22] Filed: May 12, 1994

[51] Int. Cl.[6] .................... G03B 13/10; G03B 27/52

[52] U.S. Cl. .................... 354/354; 355/40

[58] Field of Search .................. 354/354, 105; 355/40, 355/41, 77; 235/375, 376

[56] References Cited

U.S. PATENT DOCUMENTS

| | | | |
|---|---|---|---|
| 3,947,109 | 3/1976 | Kinder et al. | 355/41 |
| 4,115,981 | 9/1978 | Hell et al. | 53/55 |
| 4,186,837 | 2/1980 | Popiel et al. | 209/565 |
| 4,293,215 | 10/1981 | Rosborough, Jr. et al. | 355/40 |
| 4,716,711 | 1/1988 | Signoretto | 53/460 |
| 4,800,406 | 1/1989 | Signoretto | 354/105 |
| 4,838,435 | 6/1989 | Alexandre et al. | 354/105 |
| 4,881,090 | 11/1989 | Signoretto | 354/105 |
| 4,933,711 | 6/1990 | Gudmundson et al. | 355/40 |
| 4,974,825 | 12/1990 | Bizic et al. | 271/2 |
| 5,070,677 | 12/1991 | Hicks | 53/435 |
| 5,101,225 | 3/1992 | Wash et al. | 354/40 |
| 5,122,823 | 6/1992 | Baxter et al. | 354/212 |
| 5,124,742 | 6/1992 | Yoshikawa | 355/41 X |
| 5,200,777 | 4/1993 | Zander | 354/275 |

*Primary Examiner*—D. Rutledge
*Attorney, Agent, or Firm*—Peter J. Bilinski

[57] ABSTRACT

Photographic apparatus is provided for combining film and prints with packaging material including an image of customer inscribed graphics, such as a return address, provided with the order. The graphics are captured and stored electronically as an image that is linked to the film and prints and reproduced on packaging or other material for returning the order. The packaging is provided at the finishing station in a plurality of different formats corresponding to the size of the prints or the thickness of the completed order. The finishing station selects the appropriate format for the order and reproduces the image of the customer inscribe graphics on the selected format.

7 Claims, 8 Drawing Sheets

ORDER FINISHING

CROSS-REFERENCE TO RELATED APPLICATIONS

Reference is made to the following commonly assigned U.S. patent applications, all filed on even date herewith; Ser. No. 08/242,091 entitled ORDER CODING, filed in the name of Walter C. Slater et al.; Serial No. 08/241,986 entitled RANDOM BATCH PHOTOFINISHING, filed in the name of Jack C. Marti, Jr. et al.; and Ser. No. 08/242,563 entitled FILM CARTRIDGE MAGAZINE, filed in the name of Allan G. Reddig et al. The disclosures of the above-referenced applications hereby are incorporated into the present specification.

BACKGROUND OF THE INVENTION

1. Field of Invention

The invention relates to photographic processing, and more specifically to a photofinishing operation that matches film and prints with appropriate packaging and graphics reproduced from the original order.

2. Description of the Prior Art

Photographic processing of exposed film into prints typically is accomplished in an automated production facility that simultaneously handles many customer orders batched together for efficiency. The film may be mailed to the facility directly from the photographer or, more likely, it is forwarded through a dealer. In both cases the film usually is contained in an envelope that includes instructions for processing the film, such as the number and size of prints, and a hand-written name and address of the photographer. When the envelope is provided by the dealer, it also may include a machine-readable bar code identifying the dealer, and from which the envelope format frequently will be known.

The original customer envelope is retained during processing to provide the customer name and address for returning the prints, again either directly or through the dealer. The envelope is matched with the film and prints at the end of the process by using the batch structure of the process itself.

Throughout the process, the respective parts or corresponding components of a customer order are tracked mechanically by batch sequence. The film is batched after removal from the envelope and spliced into a large roll that is maintained through development and printing. The paper is printed in large rolls in the same sequence, and the prints remain in that sequence until cut and matched with the film for packaging and return. The original customer envelopes also are batched and ordered physically to match the sequence of the spliced film rolls.

At the end of the process, all of the order components come together at a finishing station according to the batched sequences. The customer envelopes are retrieved and assembled with the film and prints to provide the customer name and the return mailing address.

PROBLEM SOLVED BY THE INVENTION

Names, addresses and instructions inscribed by the customer on the original order frequently are handwritten and not easily decipherable by automated equipment. Manual data entry and batch order tracking have been employed successfully for many years to retain customer provided information, but such approaches are manual and unduly cumbersome when applied to modern high-volume facilities.

More recent approaches to photographic processing employ random-order techniques. The physical sequence of the various order components, primarily the film, may be random at the beginning of the process or lost at some later point. The available options for retrieving the return address, and other information not easily decipherable by machine, are severely limited with film processing in random-order.

SUMMARY OF THE INVENTION

The present invention is directed to overcoming one or more of the problems set forth above. Briefly summarized, according to one aspect of the invention, a photofinishing station is provided for combining film and prints with packaging material including a reproduced image of customer inscribed graphics, such as a return name and address, provided with the order. The graphics are captured and stored electronically as images that are linked to the film and prints and reproduced at the finishing station for inclusion with the returned materials.

According to more specific features, the packaging is provided at the finishing station in a plurality of different configurations corresponding to the size of the prints or the thickness of the completed order. The finishing station selects the appropriate packaging for returning the order and reproduces an image of the customer inscribed graphics on the selected package.

Photographic prints are assembled and packaged in a flexible operation that does not require batch sequencing or even retention of the original order materials. The operation is substantially automated and efficiently accommodates mixed orders including development, reprints and makeovers. Multiple print widths and order sizes are easily handled without labor-intensive equipment changeovers or monitoring.

Special information can be added to the return packaging, and can be selected according to dealer or geographical area without regard for the sequential order of the prints. In a similar manner, the prints can be tracked efficiently to initiate shipping by dealer or area as soon as the pertinent orders are completed for the day, again regardless of the order of processing. Such operations can be completed on-line, on a real-time basis, or off-line in near real time.

DESCRIPTION OF THE PREFERRED EMBODIMENTS

Figure 1:
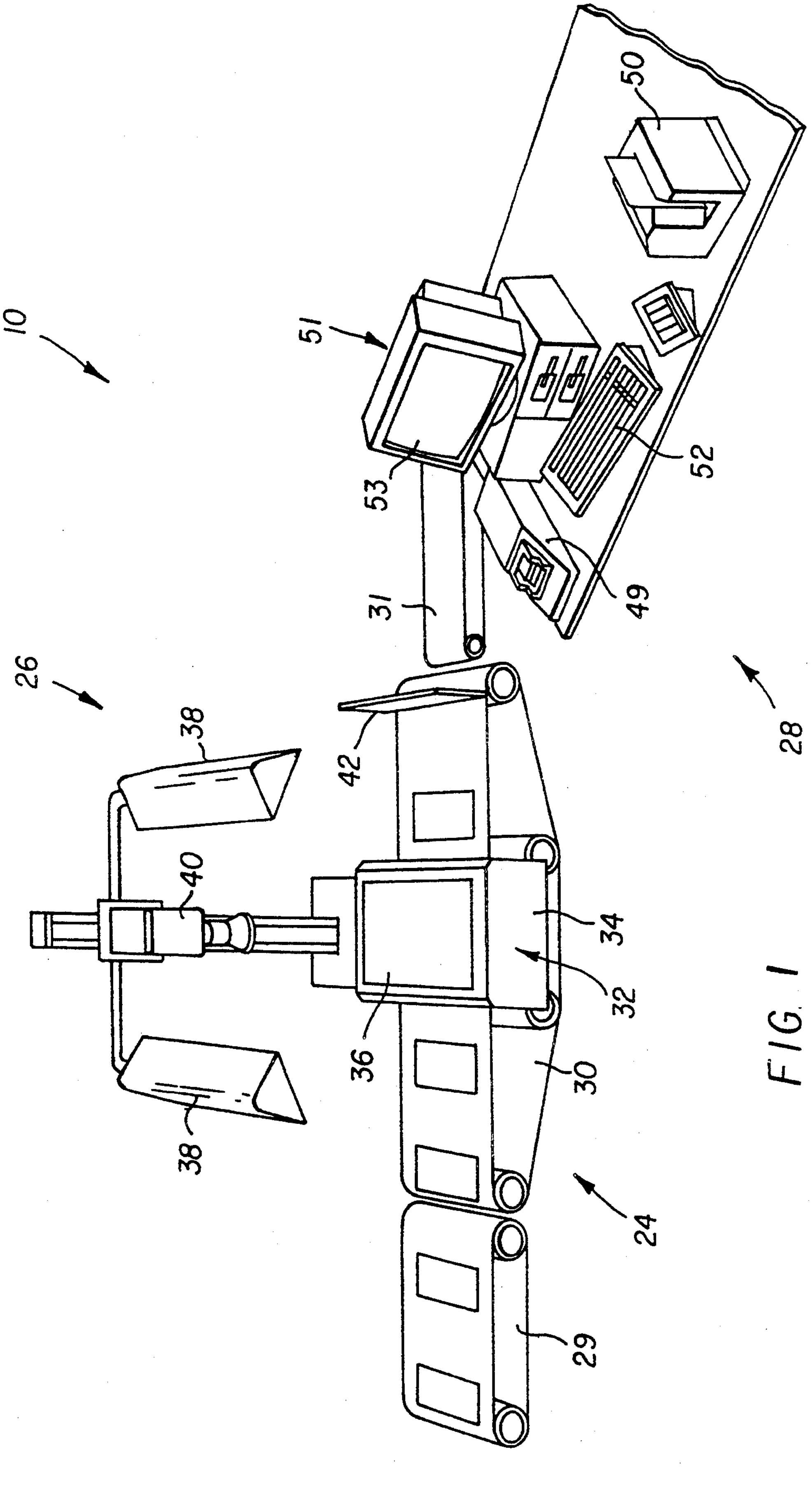
FIG. 1 is a schematic representation of an order coding station for use with the invention, including envelope and cartridge scanners and an order entry terminal, for recording and linking components of the order with instructions and other information from the custom.

Referring now to the drawings and to a preferred embodiment of the invention, a number of automated stations are depicted for processing photographic film into finished prints according to customer provided instructions. The stations include order receiving and information capture 10 (FIG. 1), film development 12 (FIG. 3), machine sorting 14 (FIG. 3), printing 16 (FIGS. 4 and 5), paper processing 18 (FIG. 6), finishing and packaging 20 (FIGS. 7 and 8) and an information processing and control network 22 (FIG. 7).

The film rolls and cartridges that will be described according to the preferred embodiment are referred to as thrust loading, and are described more fully in Baxter et al. U.S. Pat. No. 5,122,823, issued June 16, 1992; and Zander U.S. Pat. No. 5,200,777 issued Apr. 6, 1993. The film is retained with the cartridge during processing and printing, preferably by attachment to a film spool inside the cartridge, and is extended by unwinding the film for the various processing and printing operations. The cartridge is designed so the outermost convolution of film will be stripped from its roll by such unwinding and expelled through the cartridge opening.

Beginning now with FIG. 1, the order receiving and information capture station 10 includes a transport 24, an envelope reader 26 and an operator station 28. The transport 24 extends in three sections 29, 30 and 31, for conveying the customer order and its contents between a plurality of operating positions. The first transport section 29 is an endless belt adapted for receiving unopened customer orders spaced sequentially in a row for convenient delivery, one-at-a-time to the second section 30. The second section operates intermittently to deliver the envelopes to an information capture station 32, where an air bladder 34 inflates inside a rigid frame to flatten the belt and envelope against a transparent platen 36. The platen and envelope are illuminated by a light source 38, and viewed by an electro-optical imaging camera 40, including a CCD (charge coupled device), that captures a bit-mapped image of portions or the entire order envelope. The image is stored in memory in association with a code referred to as a local product code or LPC that identifies characteristics of the order. The air bladder is then deflated and the envelope continues to the end of the central section where it is stopped by a fence 42.

The term "envelope," as it is used throughout this specification, is intended broadly to mean the package in which film rolls are delivered with instructions for processing, which is the order envelope, or in which prints are returned after processing, which is the return envelope.

Figure 2:
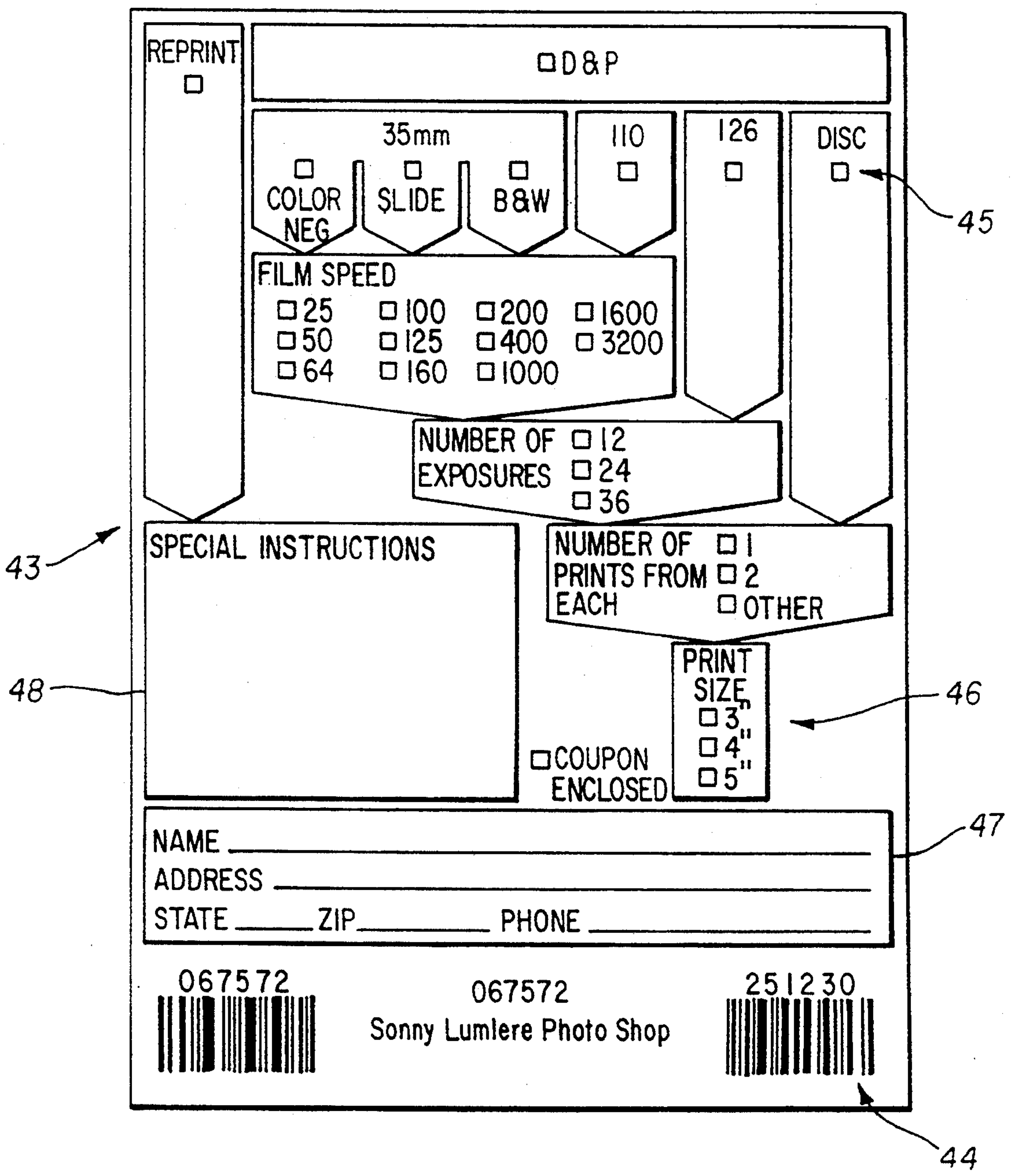
FIG. 2 is a schematic representation of an order envelope for use with the invention, including a template having areas for customer inscribed graphical information.

As described more fully in the above crossreferenced application Ser. No. 08/242,091, and depicted on FIG. 2, the order envelope 43 includes a dealer and template identification 44, areas 45 and 46 where a mark indicates a predetermined customer instruction that can be deciphered by the processing apparatus, and areas 47 and 48 that might include eye-readable information, such as a handwritten name and address, that is not easily decipherable by the apparatus. The order receiving and information capture station 10 electronically captures the dealer and template identification, and both types of customer supplied information. It identifies and interprets the marks in the first areas representing a customer instruction. In the second areas, not easily decipherable by machine, the station captures an image of the area electro-optically and stores the information for later use as will be described.

The envelopes are retrieved manually from the central section at fence 42 and opened to remove the film, which remains in its cartridge. The cartridge includes a unique identification number, sometimes referred to as a cartridge ID or CID, which is applied during manufacture as a bar code, or other machine readable mark, and may be associated with information about the type of film in the cartridge and its roll length. The cartridge ID (CID) is captured at station 28 by a bar code reader 49 (FIG. 1) and stored in memory with a link or tag to the information captured from the envelope.

The information captured from the envelope is linked in memory to the film cartridge and the corresponding customer order, and can be retrieved from the system at any time using the cartridge identification (CID). The CID is used throughout the processing operation at the respective stations to track each film cartridge on an individual basis and to determine information about the film pertinent to its processing.

The envelope is kept primarily as a back-up, and for this reason is marked in an envelope printer 50 with the cartridge ID. It is then stored for some relatively short period and discarded.

A computer 51 (FIG. 1) with a keyboard 52 and video display 53 are provided for verification and manual entry if the primary automated system is unable to find or decipher the information it requires.

Figure 3:
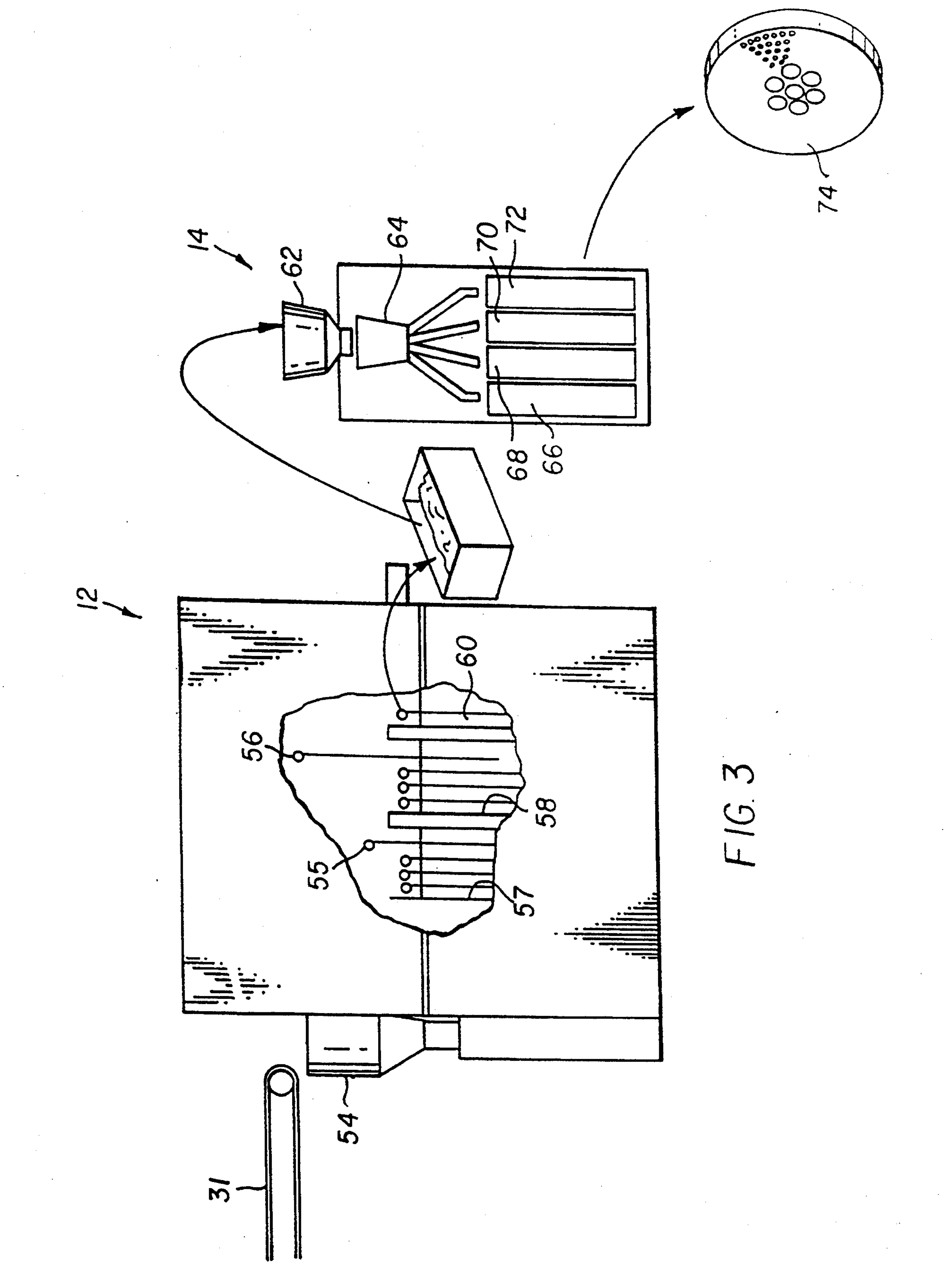
FIG. 3 is a schematic representation of a film developing station employing random order processing for which the invention is particularly useful.

From the operator station 28 the film is returned to transport 24 at its third section 31 for movement to the film development station 12 (FIG. 3).

In the film development station 12 (FIG. 3) the film rolls are transferred from transport section 31 into chute 54. No particular order of the film units is required and the rolls are not spliced together. Instead each film roll is handled together with its cartridge as an individual unit that is developed by extending or thrusting the film from its containing cartridge and moving it between the required processing solutions so the film will extend from the cartridge into the solutions. The developing process sometimes is referred to as dip-and-dunk, because the film rolls, 55 and 56 for example, are extended from their cartridges and lowered into a plurality of tanks 57, 58 and 60 of developing solutions, one-tank-after-another, according to a conventional developing process. After development, the film is rewound into the same cartridge for movement to the next station. Preferably, the film is attached to the cartridge so it will not accidentally separate from its cartridge or the unique CID and information associated therewith. In alternative embodiments, however, the film may be removed from and repositioned in the cartridge at various points in the process. One such example is disclosed in the above cross referenced application Ser. No. 08/241,986.

After the film is developed into a printable negative, it moves to station 14 for machine sorting, which separates the rolls by size, paper surface or other characteristics required for printing. The rolls are loaded in hopper 62 and pass through a sorting section 64 that reads the CID from the cartridge, retrieves the customer provided instructions associated therewith and directs the film rolls into various bins 66, 68, 70 and 72, depending on the desired surface finish or other properties pertinent to the desired prints. The film rolls from each bin then are collected in large film loading magazines 74 that are suitable for carrying the film between stations and loading it into the printer.

Figure 4:
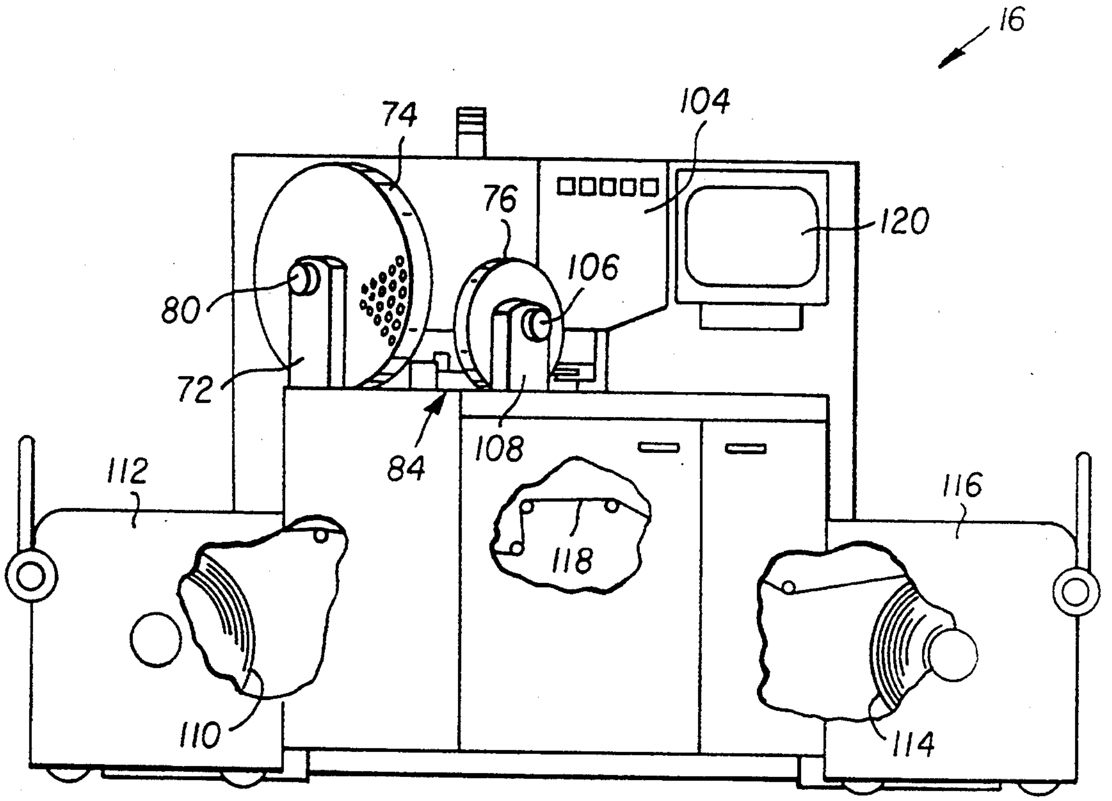
FIG. 4 is a schematic front elevation view of a printing station for use with random order film processing and for which the invention is particularly useful.
Figure 5:
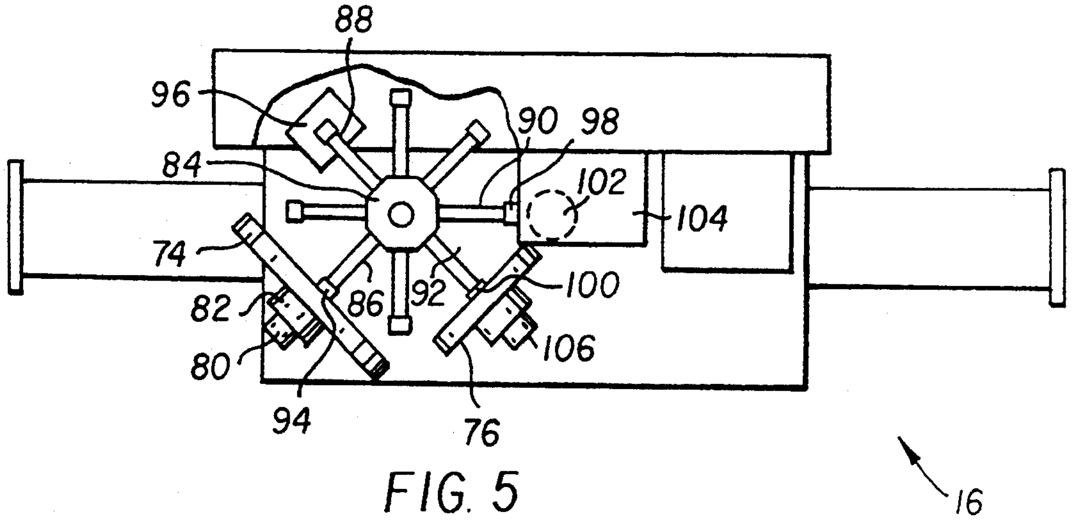
FIG. 5 is a schematic top view of the printing station of FIG. 3, depicting a turret for handling the film rolls during the printing operation.

Referring now to FIGS. 4 and 5, a printing operation is depicted in which the film rolls are retrieved from the film loading magazine 74, printed, and then batched after printing in a film batching magazine 76. The magazine 76 defines a batch of film rolls, in the same order they were printed, and maintains that batch and order for the remainder of the processing operations until the film is matched with the developed prints for packaging as a completed order. The batch size is established during the printing operation to maximize that operation and particularly its use of photographic paper.

Film loading magazine 74 is mounted in printer 16 on a rotary support 80 suspended on arm 82 above a film-handling spider-turret 84. The film rolls are pushed from the magazine by a push-rod, or the like, and are manipulated between the printing stations by the turret until reloaded after printing into the batching magazine 76.

The turret includes a number of radially-extending reciprocatable arms represented at 86, 88, 90 and 92, that index with the turret between the respective printing stations 94, 96, 98, and 100. The printing stations include a loading station 94, adjacent magazine 74, for removing the film rolls from the loading magazine; a scanning station 96, for scanning the film to determine various printing characteristics of the negatives; a printing station 98, where the film images are exposed to a light source 102 in lamp house 104, for projecting images of the negatives through appropriate optics (not shown) onto the photographic paper; and an unloading station 100 for positioning the film rolls in the batching magazine 76. Like the loading magazine 74, the batching magazine is mounted for rotation at 106 on arm 108.

Photographic paper is supplied in large rolls 110 contained in light-tight cartridge 112, at one end of the printer, and taken-up after printing in similar rolls 114 and cartridge 116 at the other end of the printer. Between the supply and take-up rolls, 110 and 114, the paper is threaded though a print exposure section 118 where it is tensioned for exposure to the image projected from exposure station 98 by light source 102 and associated optics (not shown).

Communications and set-up of the printing operation is provided through communication channels between a printer control represented by CRT 120.

In operation of the printer, film rolls are mounted substantially in random order at the loading station 94 and moved through the respective printer stations, one-at-a-time, by the spider turret 84. At each station the film is extended by unwinding, and information required by that station is retrieved either from the film itself or from the computer network using the unique cartridge identification number (CID). The operation for that particular station is completed, and the film is rewound back into the same cartridge for indexing to the next station. When all printing operations are completed, the film rolls are loaded into the batching magazine 76 to retain the order in which they were printed and for movement to the paper developing and finishing stations.

Figure 6:
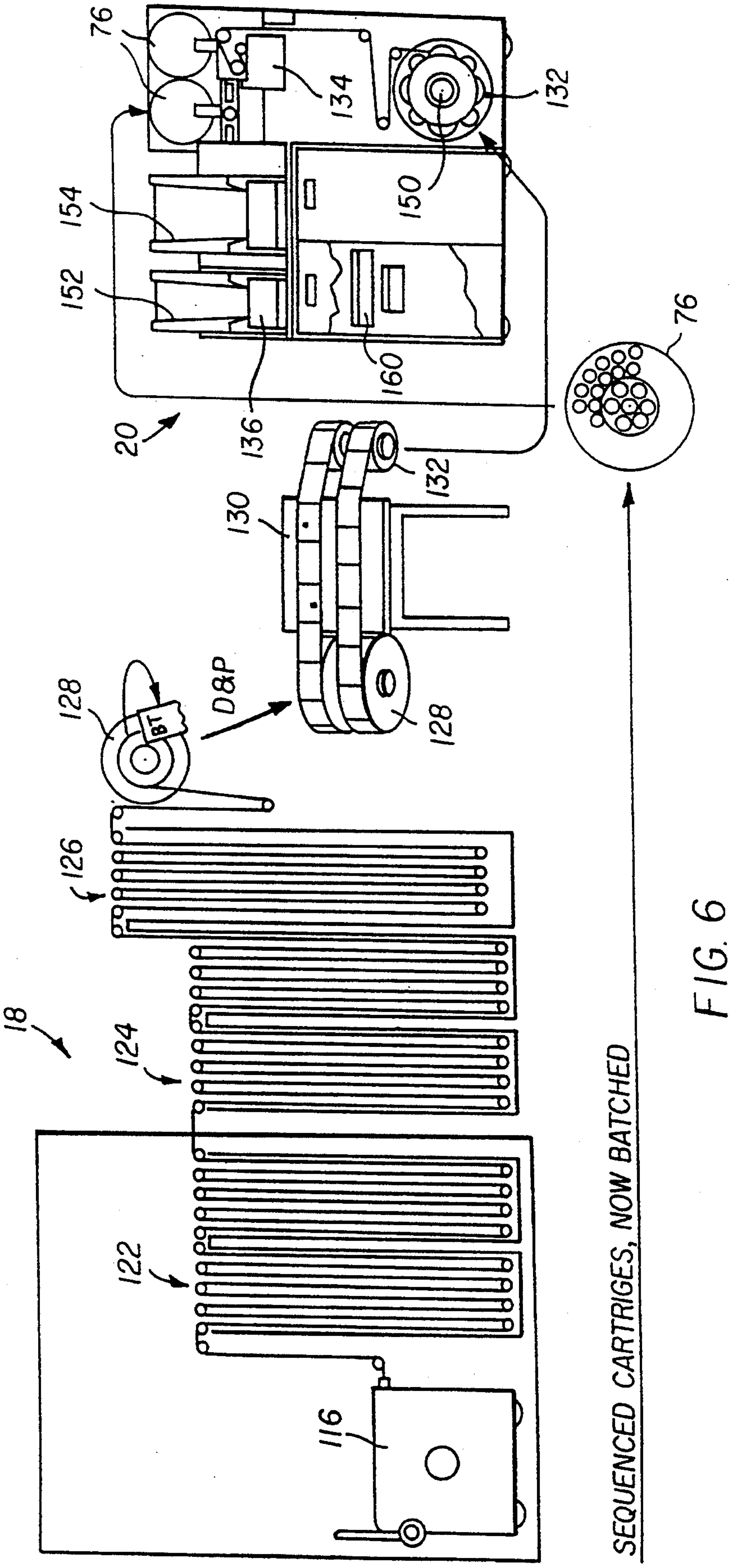
FIG. 6 is a schematic representation of paper processing and finishing stations including the invention.
Figure 7:
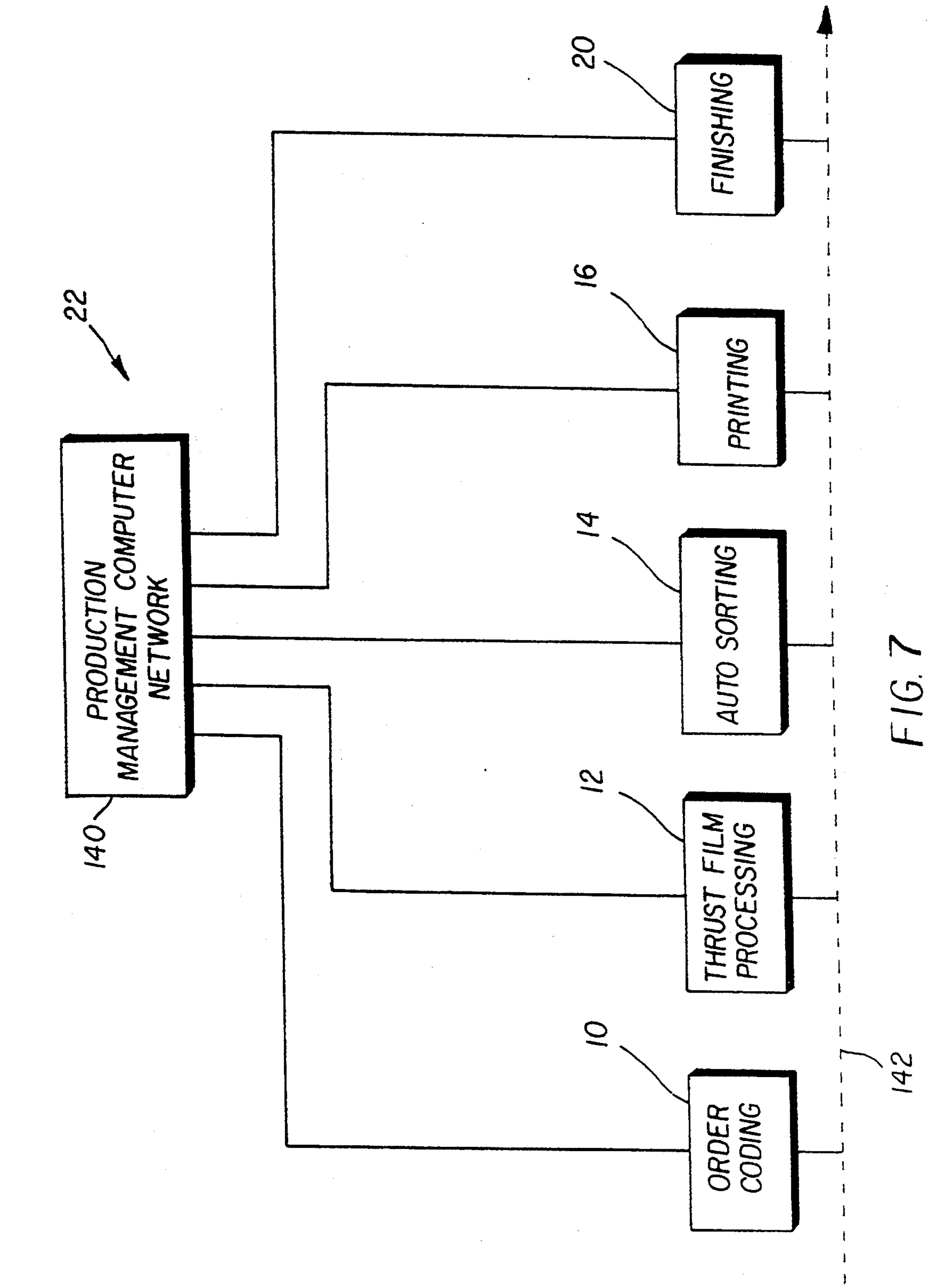
FIG. 7 is a block diagram depicting a production management system for linking information associated with the film, customer instructions, graphics and post-development operations.

FIG. 6 depicts the paper developing operation. The paper rolls 114 are transferred from the printer to the developing station in their light tight cartridges 116. The paper is withdrawn in a dark room and threaded for development through a plurality of solutions in tanks 122 and 124, followed by a drying chamber 126, according to conventional processes. After drying, the prints are wound into rolls 128 for delivery to the inspection and finishing stations.

After development, the prints may be visually inspected at table 130 and are rewound into rolls 132 for finishing in station 20. The finishing station will be described more fully hereinafter. Briefly, however, the paper is cut into individual prints at cutting station 134, matched with the appropriate film roll from batching magazine 76 and packaged ion a new envelope retrieved from supply 136 for return to the customer. The film rolls, which have been retained in their batched order from the printer, easily are matched with their corresponding prints for packaging and return.

FIG. 7 depicts the information processing and control network 22, including a production management computer 140 coupled to logic associated with each of the processing stations. At the order entry and information capture station 10, the envelope and the film cartridge it contains are viewed to capture the customer instructions and other information from the envelope and to link that information to the cartridge and its ID. At the film developing station the cartridge ID may be used to determine the film type for processing. During auto-sorting, the unique number is used to retrieve the customers instructions regarding paper surface requested. At printing the customer information is used to determine the number of prints. Some information may be printed onto the backs of the prints to facilitate subsequent order matching. After packaging, the information may be used for printing the return address and applying it to the finished order for mailing.

Referring now in more detail to the features of the present invention, and to FIGS. 1 and 7–9, the finishing station 20 includes apparatus for combining film from batching magazine 76 with prints cut from roll 132. The prints are dispensed from the roll 132, advanced to the cutting station 134, severed from the roll and accumulated in close proximity to the film rolls in magazine 76. The film rolls are in the same order as the prints, and are retrieved and combined with the prints for packaging and return to the customer.

Figure 8:
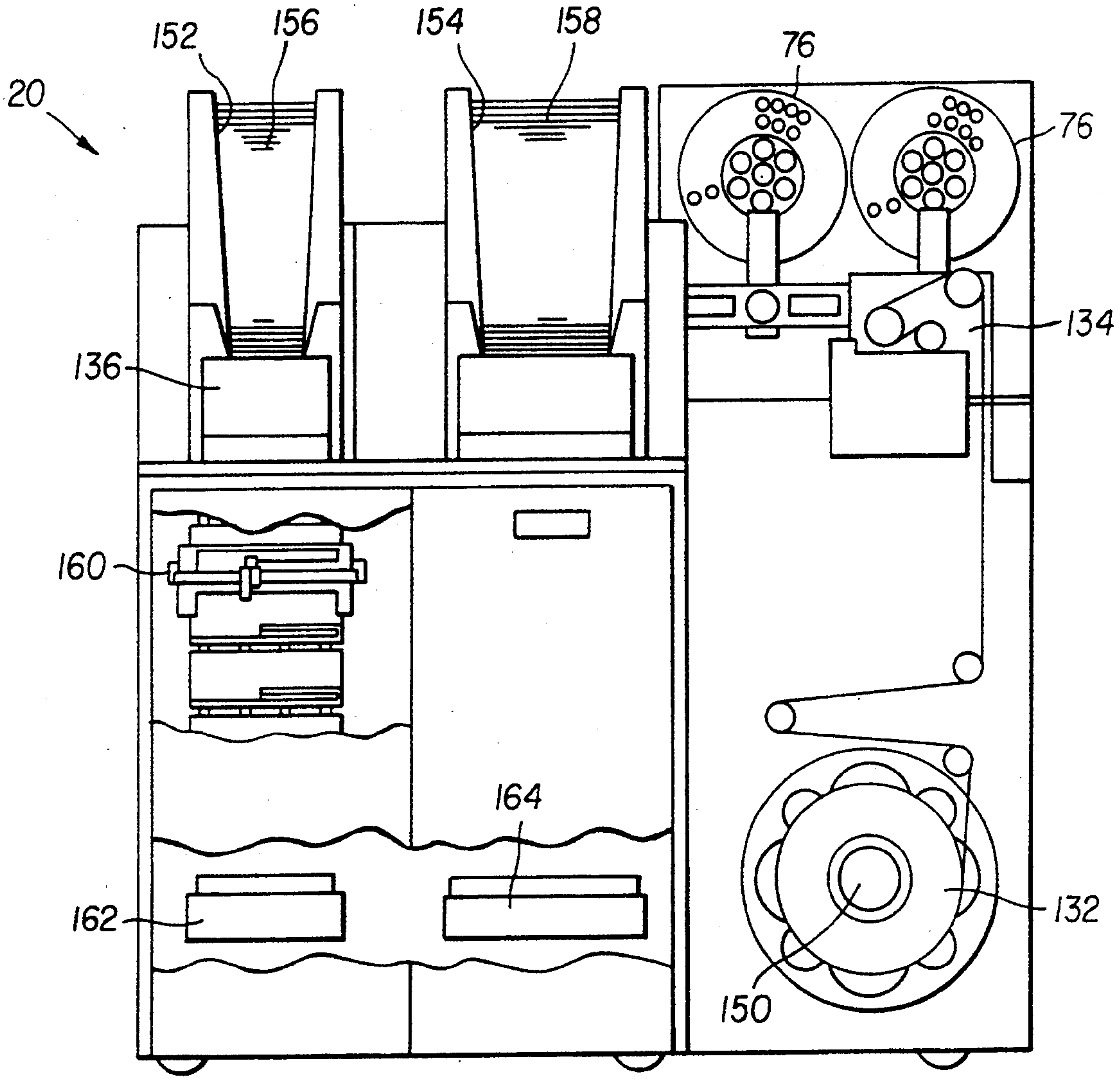
FIG. 8 is a schematic representation of finishing station according to the invention for packaging processed prints with graphics from the original order and other components associated with the order.

Return packaging material is provided in a plurality of formats in supply bins 152 and 154 (FIG. 8). The invention has particular utility with cameras capable of exposing, on a single roll of film, images in both regular formats and long or panoramic formats. To accommodate orders with regular and panoramic formats interspersed, the packaging might include regular sized envelopes 156 in bin 152 and longer or panoramic sized envelopes 158 in bin 154. Alternatively, the respective bins might accommodate envelopes suitable for small film rolls, such as a twelve exposure roll, and larger film rolls, such as a thirty six exposure roll. In either case the finishing station uses the information captured earlier in the process to select the appropriate return packaging, prepare it and combine it in sequence with the other components.

The appropriate package or envelope is selected and delivered to a digital xerographic printer 160, or the like, where previously blank portions of the packaging and associated return materials are imprinted with the return address or other image of the graphics inscribed by the customer on the original order. The graphical image is retrieved from electronic memory using the cartridge identification number (CID) linked to the corresponding film and prints. After printing, the packaging and other printed material is delivered to accumulation trays 162 and 164 for retrieval and loading with the rest of the order.

Figure 9:
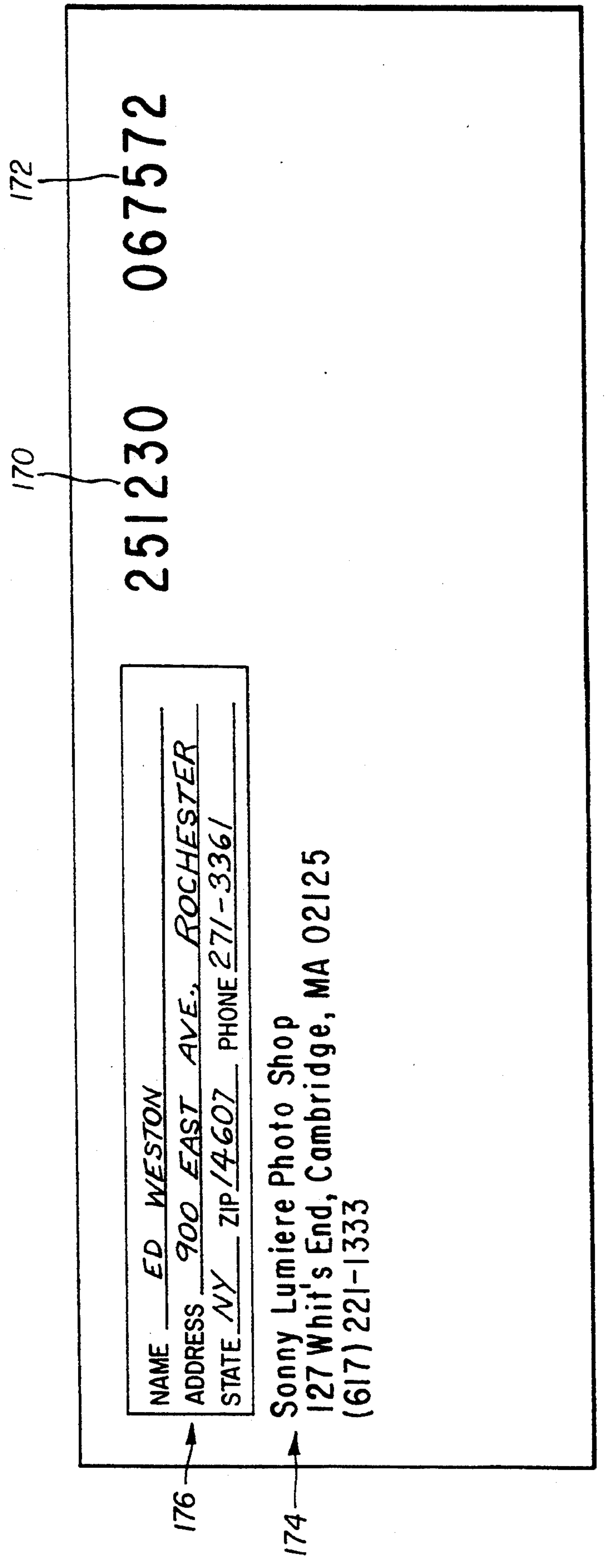
FIG. 9 is a schematic representation of graphics printed on packaging material according to the invention.

A typical return envelope is depicted in FIG. 9, including a dealer identification number 170, an envelope or template identification 172, a dealer identification name and address 174, and a photographer or customer identification name and return address 176. In this preferred embodiment, the dealer identification number, the envelope or template identification and the dealer name and address all are stored and retrieved based on the envelope bar code, while the photographer or customer name and address are retrieved from the graphic image captured electronically and stored as a bit map for later reproduction on the envelope.

Since the return package is printed a-new in the finishing station, it is particularly conducive to customized messages created at the station according to dealer or customer attributes. Pricing might be calculated and printed automatically, for example, using information associated with the local product code (LPC) and linked to the order through the cartridge identification (CID). The size, shape or other characteristics of the packaging are determined in the finishing station based on the order requirements, and the return address is tracked and applied to the packaging automatically, regardless of the order of processing.

While the invention has been described with particular reference to a preferred embodiment, it will be understood by those skilled in the art that certain aspects of the invention are not limited to the particular details of the examples illustrated, and it accordingly is intended that the claims cover all such modifications and applications that do not depart from the true spirit and scope of the invention.

PARTS LIST FOR FIGURES

Reference No. Part

10—order receiving and information capture station.
12—film development station.
14—machine sorting station.
16—printing station.
18—paper processing station.
20—finishing and packaging station.
22—information processing and control network.
24—transport.
26—envelope reader.
28—operator station.
29—first transport section.
30—second transport section.
31—third transport section.
32—information capture station.
34—air bladder.
36—platen.

38—light source.
40—electro-optical imaging camera.
42—fence.
43—order envelope.
44—bar code.
45—customer inscribed mark area.
46—customer inscribed mark area.
47—customer inscribed graphics area
48—customer inscribed graphics area
49—bar code reader.
50—envelope printer.
51—computer.
52—keyboard.
53—video display.
54—chute.
55—film roll.
56—film roll.
57—tank.
58—tank.
60—tank.
62—hopper.
64—sorting section.
66—bin.
68—bin.
70—bin.
72—bin.
74—film loading magazine.
76—film batching magazine.
80—rotary support.
82—arm.
84—spider-turret.
86—reciprocatable arm.
90—reciprocatable arm.
92—reciprocatable arm.
94—reciprocatable arm.
96—loading station.
98—scanning station.
100—printing station.
100—unloading station.
102—light source.
104—lamp house.
106—rotation mount.
108—arm.
110—paper supply roll.
112—paper supply cartridge.
114—paper take-up roll.
116—paper take-up cartridge.
118—exposure section.
120—CRT.
122—tank.
124—tank.
126—drying chamber.
128—print roll.
130—inspection table.
132—print roll.
134—print cutting station.
136—envelope supply.
140—production management computer.
152—package supply bin.
154—package supply bin.
156—return envelope.
158—return envelope.
160—printer.
162—collection tray.
164—collection tray.
170—dealer identification number.
172—envelope template identification.
174—dealer name and address.

176—customer inscribed graphics.

What is claimed is:

1. A photofinishing station for accumulating prints, and film from which the prints were made, with packaging material according to a customer order, the order including customer inscribed graphics, said photofinishing station comprising:

means for cutting the prints from a roll of said prints according to a customer order;

means for retrieving the film from which the prints were made;

means providing the packaging material for receiving said prints and film; and, means for reproducing on said packaging material an image of the customer inscribed graphics.

2. The invention according to claim 1, wherein the packaging material includes a customer return envelope and the image includes a return address.

3. A photofinishing station for combining prints and film corresponding to a customer order with packaging in an appropriate format selected from a plurality of formats, the order including customer inscribed graphics, said photofinishing station comprising:

a support for receiving a roll of the prints;

a cutting mechanism for separating the prints from the roll according to the order;

a film retrieving mechanism for presenting the film corresponding to the order in close proximity to the separated prints;

a package supply mechanism for delivering packaging blanks in a plurality of formats;

a package selecting mechanism for retrieving packaging from said supply mechanism in the appropriate format for said cut prints and corresponding film; and, means for reproducing on said packaging an image of the customer inscribed graphics.

4. A photofinishing station for combining a) prints in a roll, with b) film from which the prints were exposed, and c) return graphics provided by the customer with the order, said station comprising:

means for cutting the prints from the roll and for assembling the prints according to the order;

means for retrieving film from which the prints were exposed and for presenting the film in close proximity to the prints;

means for delivering packaging to receive the prints and film for return to the customer, said packaging including material for receiving a return address; and, means for storing the customer provided graphics as an image and for reproducing the image on the material for receiving a return address.

5. Photographic apparatus for combining film and prints with packaging material for return according to instructions provided with an order requesting the prints; the apparatus comprising:

means for capturing and storing the instructions electronically as a graphical image;

means for providing packaging material including blank sections for receiving the graphical image;

means for reproducing the graphical image in the blank sections of the packaging material; and, means for assembling the marked packaging material with the film and prints all corresponding to the order.

6. Apparatus for capturing and using graphical information provided with a customer order, the order including film delivered for processing to make photographic prints; said apparatus comprising:

means for electro-optically recording the image of the graphical information in electronic memory with a unique identification;

means for processing the film to make the prints, said processing means including means for linking the film and prints to the unique identification;

means for providing packaging material including blank sections;

means for reproducing the graphical information in the blank sections of the packaging material; and, means using the unique identification for assembling the packaging material with the film and prints all corresponding to the order.

7. Apparatus for capturing and using a return address provided with a film in an order for photographic prints, the film including a machine-readable identification, the apparatus comprising:

means for electro-optically capturing in electronic memory the film identification;

means for electro-optically capturing in electronic memory an image of the return address;

means for maintaining during processing an electronic link between the film identification and the return address;

means for packaging the film and prints for return after processing; and, means for reproducing and applying the return address to the package.

* * * * *